United States Patent [19]
Fleischauer

[11] 3,961,700
[45] June 8, 1976

[54] LIMITED TORQUE CONVEYOR CONSTRUCTION

[76] Inventor: Fred J. Fleischauer, 1345 Meadowlark Drive, Pittsburgh, Pa. 15243

[22] Filed: Aug. 9, 1973

[21] Appl. No.: 387,152

[52] U.S. Cl. .......................... 198/127 R; 64/28 M; 192/84 PM
[51] Int. Cl.² ................. B65G 13/08; B65G 13/073
[58] Field of Search ............... 198/127 R; 64/28 M, 64/2 R; 192/84 PM

[56] References Cited
UNITED STATES PATENTS

| | | | |
|---|---|---|---|
| 3,318,410 | 5/1967 | Johnson et al. | 64/2 R |
| 3,327,837 | 6/1967 | Covell | 198/127 R |
| 3,610,404 | 10/1971 | Fleischauer et al. | 198/127 R |
| 3,610,406 | 10/1971 | Fleischauer et al. | 198/127 R |
| 3,650,375 | 3/1972 | Fleischauer et al. | 198/127 R |
| 3,667,589 | 6/1972 | Constable | 198/127 R |
| 3,753,485 | 8/1973 | Fromme et al. | 198/127 R |
| 3,791,898 | 2/1974 | Remi | 64/2 R |
| 3,837,232 | 9/1974 | Fredell et al. | 64/28 M |
| 3,840,110 | 10/1974 | Molt et al. | 198/127 R |

*Primary Examiner*—Evon C. Blunk
*Assistant Examiner*—Jeffrey V. Nase
*Attorney, Agent, or Firm*—Donn J. Smith

[57] ABSTRACT

I disclose a conveyor construction comprising a support, a plurality of conveyor rollers rotatably mounted on said support and defining a pass line for articles conveyed by said conveyor construction, a drive member for each of selected ones of said rollers, a common drive shaft rotatably mounted adjacent said drive members, a magnetic coupling connecting each of said drive members with one of said drive shaft and the associated roller, and a flexible drive belt coupling each of said drive members to the other of said drive shaft and said associated roller.

2 Claims, 14 Drawing Figures

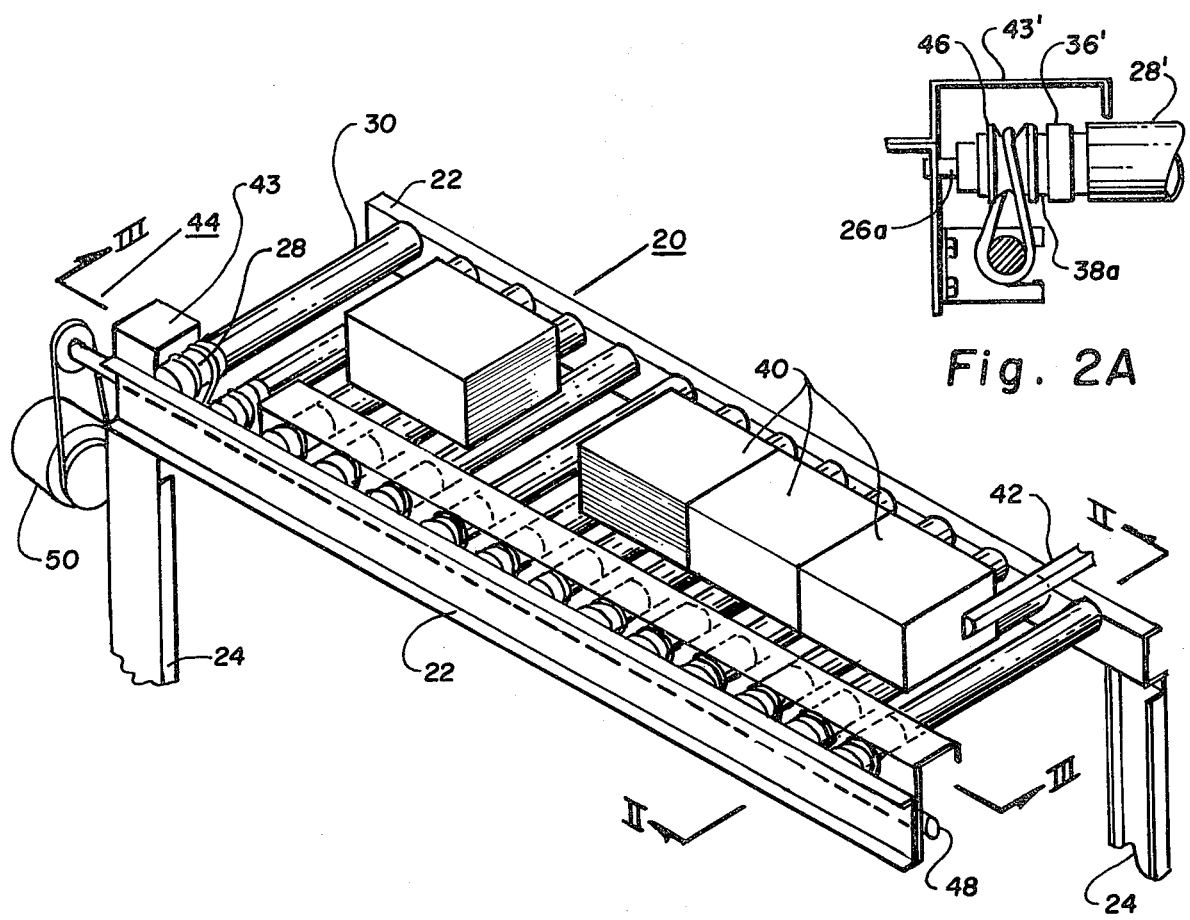
Fig. 2A
Fig. 1
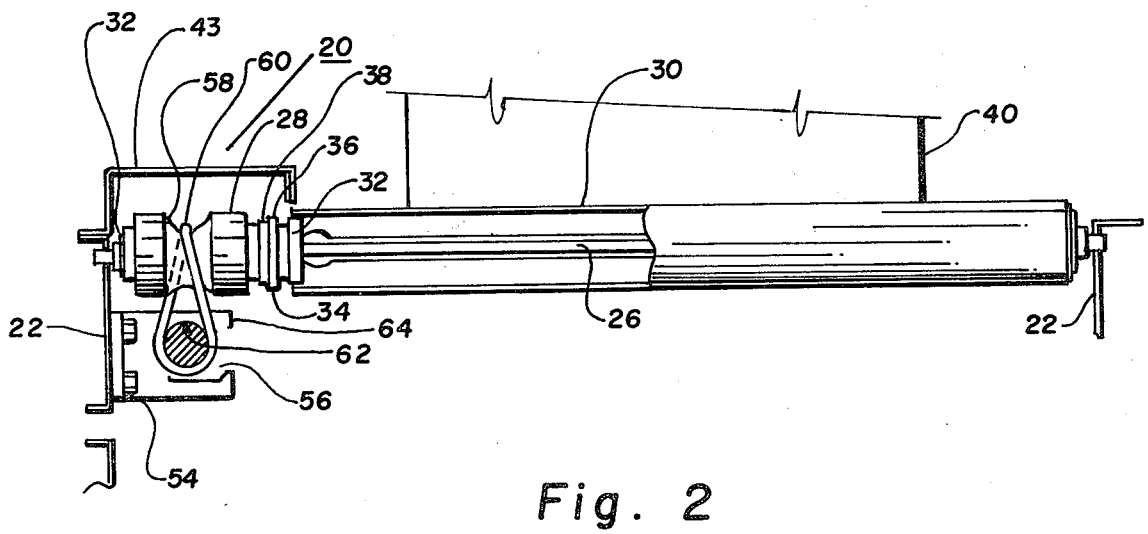
Fig. 2

LIMITED TORQUE CONVEYOR CONSTRUCTION

This application is an improvement upon certain features of my previous application entitled "Conveyor Constructions and Torque-Limiting Transmissions Therefor," Ser. No. 714,625, filed Mar. 20, 1968, now U.S. Pat. No. 3,610,406, jointly with John D'Amore and Ralph C. Green.

The present invention relates to materials transfer and more particularly to conveyor constructions having means for limiting the torque output of the drive mechanism.

Because of the difficulties involved in the construction and use of accumulation conveyors, my invention will be described primarily in this applicative background. It will be apparent, however, that my invention has other uses, some of which will be mentioned below. The advantages of providing a limited-torque transmission in an accumulation type conveyor have been set forth in detail in the aforementioned U.S. Pat. No. 3610406.

O-ring or similar transmission belt drives for roller conveyors, wherein a number of rollers are coupled to a single drive shaft through a like number of O-rings, have been known for some time, for example Swedish Pat. No. 152,470. To prevent the O-rings from unduly wearing and breaking, each of the O-rings are mounted on a grooved sleeve which is frictionally coupled to the common drive shaft. This arrangement still however results in considerable wear upon the O-rings at the grooves formed in the rollers and also at the grooves formed in the sleeves, particularly when the sleeves tend to slide axially as the torque upon the rollers is varied.

This problem is alleviated to a considerable extent by the improved O-ring driving arrangements described and claimed in the following Fleischauer et al Patents:

Self-Energizing Brake for Roller Conveyors, No. 3,621,982;
Drive For Roller Conveyors, No. 3,650,375;
Brake For Gravity Roller Conveyors, No. 3,627,092;
Curved Powered Roller Conveyor, No. 3,610,404;
Gravity Roller Conveyor With Pulsating Band Brake, No. 3,627,091;
and
Brake for Roller Conveyors, Ser. No. 3,696,912.

The aforementioned and other relevant prior art has nevertheless not entirely solved the problems involved with O-ring conveyor drives. In the first instance, a complex drive shaft construction becomes a prerequisite owing to the use of drive sleeves rotatably mounted on the shaft and the necessity for controlled axial slippage of the sleeves.

In the aforementioned and other prior art, moreover, there is a possibility of lubricant or other foreign matter entering the clearances between the drive shaft and the O-ring sleeves. As a result, the friction-induced, output torque of the transmission is subject to a variation which is difficult to anticipate or predict. Similar changes in the frictional coupling may occur from a wearing or polishing action of the spools or sleeves upon the drive shaft throughout the operational life of the equipment.

I overcome these disadvantages of the prior art by providing an O-ring type conveyor drive in which the individual O-ring need not be frictionally engaged to provide the torque-limiting function with the common drive shaft. Instead, the O-rings can be direct-coupled to torque-limiting transmission means forming part of my invention and associated either with a number of driven conveyor rollers or with the common drive shaft or both. The latter is thereby enabled to transmit a limited but constant torque, throughout the useful life of the equipment, to an array of conveyor rollers or the like respectively associated therewith. Thus, when articles are accumulated upon the rollers the forces applied to the O-rings do not vary substantially between a normal conveying function and the accumulation function of the conveyor. In one arrangement the individual O-rings can be looped around the drive shaft at spaced locations therealong, without grooving or otherwise providing the shaft with particular means for engaging the O-rings.

The use of the O-ring or belt drive system of my present invention eliminates the necessity of employing more complicated conventional conveyor drive arrangements such as individually driving one or a group of the conveyor rollers or by the usage of an elongated drive belt and complicated array of snub rollers disposed generally beneath the load carrying rollers of the conveyor.

More particularly, the conventional belt and snub roller drive is inappropriate for a skewed roller conveyor as the angular disposition of the roller tends to displace the belt sidewise causing undue wear. Also, the belt and snub roller drive is inappropriate for curved conveyor sections. The typical conveyor construction required for the belt and snub roller drive is sometimes quite cumbersome where space is at a premium. Belt breakage in this type of conventional drive inactivates the entire conveyor. The maximum length of the conveyor is severely delimited by this type of conventional drive arrangement.

On the other hand my novel conveyor drive mechanism is readily adapted for either skew or curve roller conveyor sections. It is unnecessary to drive every roll of the conveyor when this is not appropriate. A reverse drive section can be provided on a given conveyor construction without utilizing a separate conveyor simply by twisting the O-rings or transmission belts in the opposite direction when wrapping the O-rings about the reverse-driven rollers. Similarly, the speed of some or all of the conveyor rollers can be varied by utilizing O-ring grooves of differing diameters.

I accomplish these desirable results by providing a roller conveyor having a plurality of rollers rotatably mounted to define a pass line for articles conveyed by said conveyor, a magnetic coupling for each of said rollers, a common drive shaft rotatably mounted adjacent said rollers and extending longitudinally of said pass line, a flexible drive belt for each of said rollers, each of said drive belts being looped about one of said drive shaft and its associated roller and about the associated one of said magnetic couplings.

I also desirably provide a similar conveyor wherein each of said magnetic couplings includes a rotatable component rotatably mounted on said drive shaft and a fixed component secured to said drive shaft for rotation therewith, the associated one of said drive belts being looped about said rotatable component and the associated conveyor roller.

I also desirably provide a similar conveyor wherein each of said magnetic couplings includes a rotatable component rotatably mounted adjacent its associated roller and a fixed component secured to said roller for rotation therewith, the associated one of said drive belts being looped about said rotatable component and said drive shaft.

I also desirably provide a similar conveyor wherein said drive shaft is rotatably mounted in open sided bearing means and is maintained therein by said drive belts.

I also desirably provide a similar conveyor wherein said conveyor includes a curved section having conveyor rollers disposed in an arcuate array, said curved section including additional drive shaft means being extended along said curved section and being coupled to at least some of said magnetic couplings and said drive belts.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 is an isometric view of one form of torque-limiting conveyor construction arranged in accordance with my invention;

FIG. 2 is a cross-sectioned view of the conveyor construction as shown in FIG. 1 and taken along reference line II—II thereof;

FIG. 2A is a partial, similar view of a modified driving and torque-limiting transmission means for use with the conveyor construction of the preceding figures;

Figure 3:
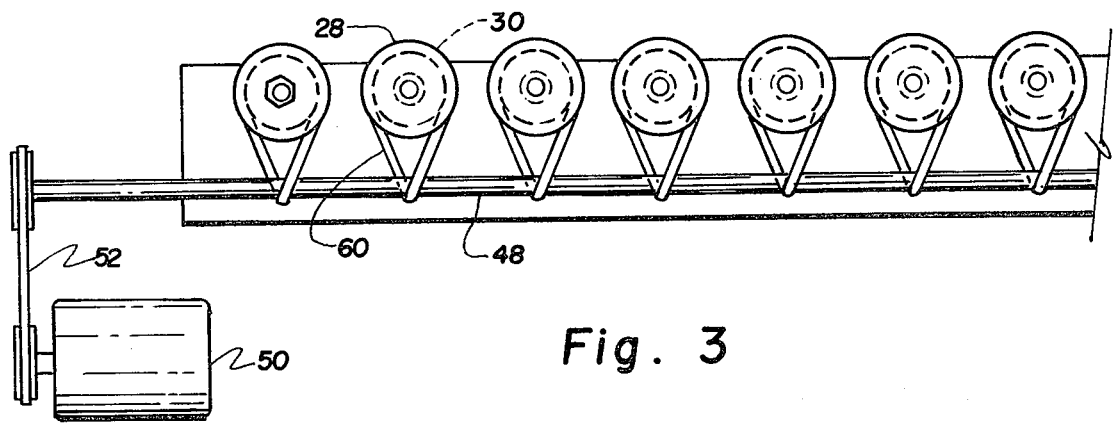
FIG. 3 is a longitudinally sectioned view of the conveyor construction as shown in FIG. 1 and taken along the reference line III—III thereof.

Referring now to FIGS. 1, 2 and 3 of the drawings, my novel conveyor construction 20 includes a pair of spaced side rails 22 mounted in this example adjacent their ends on supporting standards 24. A number of fixed shafts or axles 26 (FIG. 2) are secured adjacent their ends to the conveyor rails 22 respectively and a drive roller 28 and driven roller 30 are mounted in tandem on each of the axles 26. Each pair of driving and driven rollers 28, 30 are spaced somewhat along the length of their associated axle 26 on which they are rotatably mounted by conventional bearings 32 (FIG. 2).

Disposed in the space between each pair of driving and driven rollers 28, 30 is a magnetic coupling 34 (FIG. 2). In this instance the coupling 34 includes a pair of discoidal permanent magnets 36, 38 secured respectively to the adjacent ends of the driving roller 28 and driven roller 30. As illustrated, the permanent magnets 36, 38 are face-magnetized with the result that an alignment of the magnetic poles thereof transfers driving torque through the coupling 34 within the limits of the magnetic attractive forces generated between the magnets 36, 38. Of course, when one or more of the driven rollers 30 are stopped as by one of a number of articles 40 accumulated thereon, for example by interposition of stop bar 42, the driving roller 28 and associated permanent magnet 36 continue to rotate without substantial change in torque transfer to the driving roller 28 from the conveyor drive mechanism coupled thereto and presently to be described.

It is contemplated that a number of equivalent magnetic couplings can be substituted for the coupling 34 without departing from the spirit and scope of my present invention. Some of the couplings are described and claimed in the first-mentioned pending application, Ser. No. 714,625.

Desirably, a hood structure 43 is positioned generally over the driving components of the conveyor 20 including the driving rollers 28, the magnetic couplings 34, and the conveyor drive mechanism 44 described below. The hood 43 minimizes the entry of foreign material into the aforementioned moving component, prevents engagement of the driving rollers 28 and couplings 34 by articles 40 moving along the length of the conveyor 20, and minimizes the possibility of personnel injury. The hood 43 in this example is secured to the upper side of the adjacent side rail 22.

It will be understood that there is no prerequisite for applying torque-limited power to each of the roller assemblies of the conveyor 20. Thus, selected ones of the pairs of driving and driven rollers 28, 30 can be omitted and in their place unpowered, freely rotatable rollers (not shown) can be substituted. The latter rollers, of course, can extend across the transverse width of the conveyor between the conveyor rails 22.

As better shown in FIG. 2A it is also contemplated that the driving rollers 28 can be replaced by pulleys 46 which are similarly and rotatably mounted upon axis 26a. In this arrangement permanent magnet 38a is secured to the adjacent side of pulley 46 for rotation therewith. The remainder of the FIG. 2A structure is similar to that shown in FIGS. 1–3 and described previously, as evidenced by similar reference characters with primed accents.

Referring again to FIGS. 1, 2 and 3 of the drawings, the drive means 44 includes, in this example, an elongated shaft 48 which can be rotatably mounted on the adjacent side rail 22 and which is disposed generally beneath the array of drive rollers 28 (or the array of drive pulleys 46 of FIG. 2A). Adjacent one end of the conveyor 20 (FIGS. 1 and 3) the drive shaft 48 is rotated by suitable driving means for example electric motor 50 and transmission 52. In this arrangement the drive shaft 48 is rotatably mounted upon a plurality of brackets 54 which can be notched at 56 to permit insertion and removal of the drive shaft 48. Suitable antifrictional means (not shown) can be mounted at the notches 56, if desired.

The drive roller 28 can be grooved at 58, as better shown in FIG. 2, for reception of drive belts 60, each of which is looped around the drive shaft 48 and around the associated one of the drive rollers 28. Besides their function in rotating the drive rollers 28, the O-rings 60 aid in retaining the drive shaft 48 against the upper edges 62 of the brackets 54 so that the depending tabs 64 thereof prevent removal of the drive shaft 48 during its operation. However, when it is desired to remove the drive shaft 48 for maintenance purposes the elasticity of the O-rings 60 permit the slight downward movement of the drive shaft 48 necessary to withdraw the shaft through the open areas of the notches 56.

It is contemplated of course that the O-ring 60 be fabricated from a suitable elastomeric material for this purpose and for the purpose of maximizing the frictional engagement of the O-rings 60 with the drive shaft 48 and the drive rollers 28.

As noted previously, rotation of the drive shaft 48 delivers a substantially constant torque to the drive rollers 20 irrespective of the number of driven rollers 30 which may be loaded, unloaded or stopped depending upon the conveying or accumulation of articles 40 thereon. This results from the use of the magnetic couplings 34 described previously. Further, the use of the O-ring drives 60 in combination with the torque-limiting couplings 34 eliminates the necessity for using any friction-modifying means between the O-rings 60 and the drive shaft 48. The drive shaft 48 therefore can be provided with a smooth exterior surface exclusive of any sleeves, stops or other hardware. By the same token the drive roller grooves 58 can be omitted, provided that the length of the drive rollers 28 is such to prevent run-off of the O-rings 60.

Figure 3A:
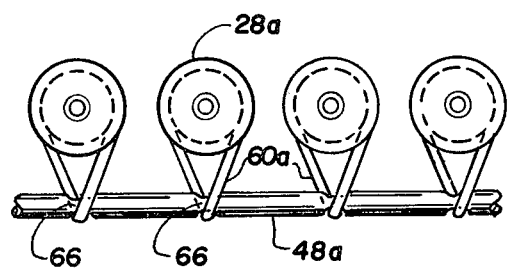
FIG. 3A is a partial view similar to that of FIG. 3 but showing a modified form of the drive shaft used in my conveyor construction.

As better shown in FIG. 3A, however, it is contemplated in certain applications of my invention that O-ring grooves 66 can be provided on drive shaft 48*a* '*to receive O-rings 60a*. Such grooves 66 desirably are rounded as shown to reduce wear of the O-rings 60*a*. In those applications wherein the O-rings 60*a* are closely spaced the grooves 66 may be desirable to facilitate assembly of the conveyor 20. The frictional coupling between the O-rings 60*a* and the drive shaft 48*a* can be enhanced by use of the grooves 66, particularly in those cases where the drive shaft is frequently and intermittently operated, to reduce any tendency of slippage and wear upon the O-rings.

Figure 4:
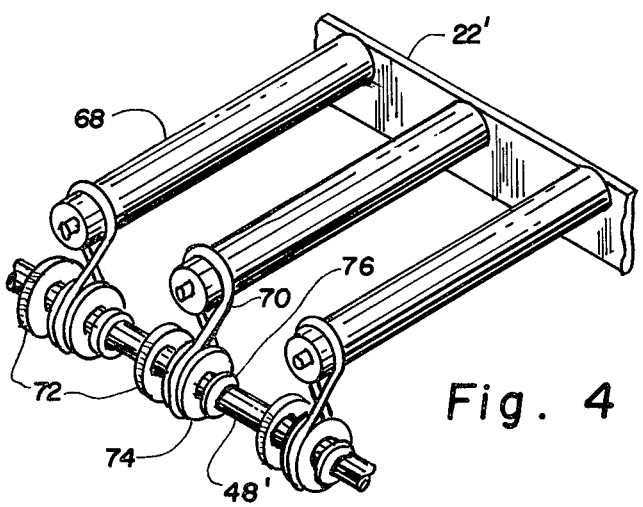
FIG. 4 is a partial, isometric view of another form of torque-limiting conveyor construction arranged in accordance with my invention, with parts removed for clarity.

In FIG. 4 of the drawings discrete drive members, such as the drive rollers 28 or the drive pulleys 46, are eliminated from the pass line of the conveyor 20', whereupon the conveyor rollers 68 are extended substantially and transversely across the distance between teh conveyor rails 22'. In the arrangement of FIG. 4 O-rings 70 are wrapped about driven rollers 68, which can be grooved (not shown) for this purpose if desired. If the rollers 68 are not grooved, desirably a hood similar to that shown at 42 in FIGS. 1–3 is disposed over the O-rings 70 to prevent contact with conveyed articles.

Alternatively the driven rollers 68 can be grooved (not shown) to such depth that the O-rings 70 are recessed slightly below the pass line of the conveyor.

In the arrangement of FIG. 4, drive shaft 48' is similarly supported beneath the driven rollers 68. Adjacent each of the driven rollers 68 a related permanent magnet 72 desirably of discoidal configuration is fixedly secured to the drive shaft 48' for rotation therewith. More directly below each driven roller 68 is a drive pulley 74 rotatably mounted on the drive shaft 48' and collocated with respect to the magnet 72. Each of the O-rings 70 is looped about its associated driven roller 68 and drive pulley 74. The drive pulley 74 is fabricated from a magnetic material and preferably is face-magnetized as is the associated magnet 72 for interaction therebetween. Obviously, other forms of magnetic couplings, as certain of those described in the first-mentioned copending application, can be employed to advantage in place of the couplings 72–74. Instead of permanently magnetizing each pulley 74 as aforesaid, the latter can be fabricated from a magnetizable material where a transfer of lesser torque is desired.

When the poles of the fixed magnets 72 and the rotatable pulleys 74 are suitably aligned, a limited torque is transferred from the drive shaft through the magnetic couplings 72–74 and the O-rings 70 to the driven rollers 68. On the other hand stoppage of one or more rollers 68, by accumulation or otherwise induces slippage in the related couplings 72–74, to limit the transmission of torque to such driven rollers. Desirably, stops 76 are secured to the drive shaft 48' adjacent each of the pulley magnets 74 to prevent undue widening of the magnetic gap between the fixed or drive magnets 72 and the rotatable or driven pulley magnets 74, when their poles are misaligned.

Figure 4A:
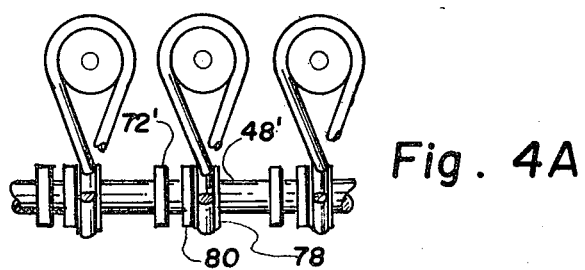
FIG. 4A is a partial elevational view of a modified conveyor construction showing another form of torque-limiting coupling with parts removed and other parts broken away for clarity.

Alternatively the drive pulleys can take the form of a conventionally shaped pulley 78 rotatably mounted on the drive shaft 48' as shown in FIG. 4A. In this arrangement an annular magnet 80 of similar face-magnetized configuration is secured to an opposed side of each pulley 78 for coaction with adjacent magnet 72 secured to drive shaft 48'. Each pulley face can be magnetized or can be provided with an annular or disc magnet (not shown) to increase the strength of magnetic coupling.

It will be understood, of course, that where a lesser amount of limited torque is desired that one of the permanent magnets of any of the aforementioned couplings can be replaced with a similarly shaped member fabricated from a magnetizable material such as iron. It will also be understood that one of the components of each magnetic coupling can be cup shaped so as to overlie the peripheral or circumferential edge of the other magnetic component to produce a radial magnetic gap rather than the illustrated axial gap. The components of the magnetic coupling are operated at synchronous speeds until a maximum design torque is reached. When this torque is exceeded the driven component of the coupling will cease to be rotated.

Figure 5:
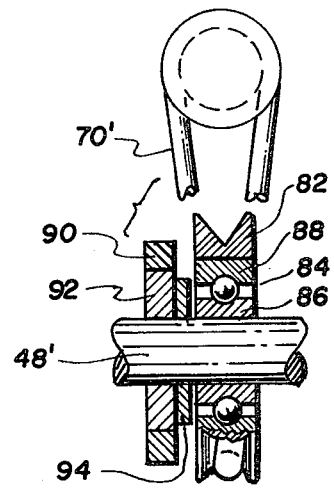
FIG. 5 is a similar but enlarged and partially sectioned view of another modification of torque-limiting transmission suitable for use in the apparatus of FIG. 4.

A somewhat similar magnetic coupling arrangement is shown in FIG. 5 of the drawings wherein a conventional pulley 82 for each of the O-rings 70' is mounted on antifrictional means or bearing 84 includes an inner race 86 secured to the drive shaft 48' for rotation therewith and an outer race 88 to which the pulley 82 is similarly secured. Collocated with each bearing 84 is a face polarized magnet 90 mounted on the circumferential edge of a discoidal support 92 which is in turn secured to the drive shaft 48 for rotation therewith.

The ring magnets 90 are face-polarized and in effect couple the inner and outer bearing races 86, 88 until a maximum design torque is reached at which slippage occurs between the bearing races. A predetermined magnetic gap between each ring magnet 90 and the associated outer bearing race 88 can be afforded by an interposed washer 94.

Figure 6:
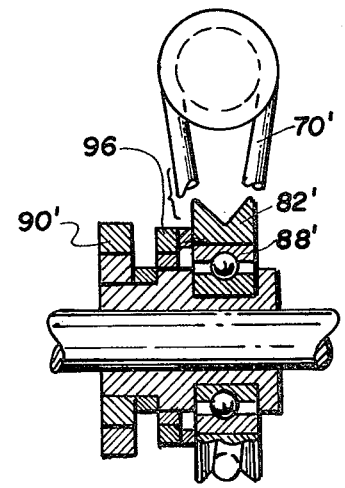
FIG. 6 is a similar view of a further transmission modification.

As better shown in FIG. 6 the magnetic attraction between the components of the magnetic coupling of FIG. 5 can be enhanced by adding a second permanent ring magnet 96, which can be located on the apposed faces of the outer bearing race 88' and pulley 82'. The magnet 96 can otherwise be configured after the manner of the previously described ring magnet 90'.

Figure 7:
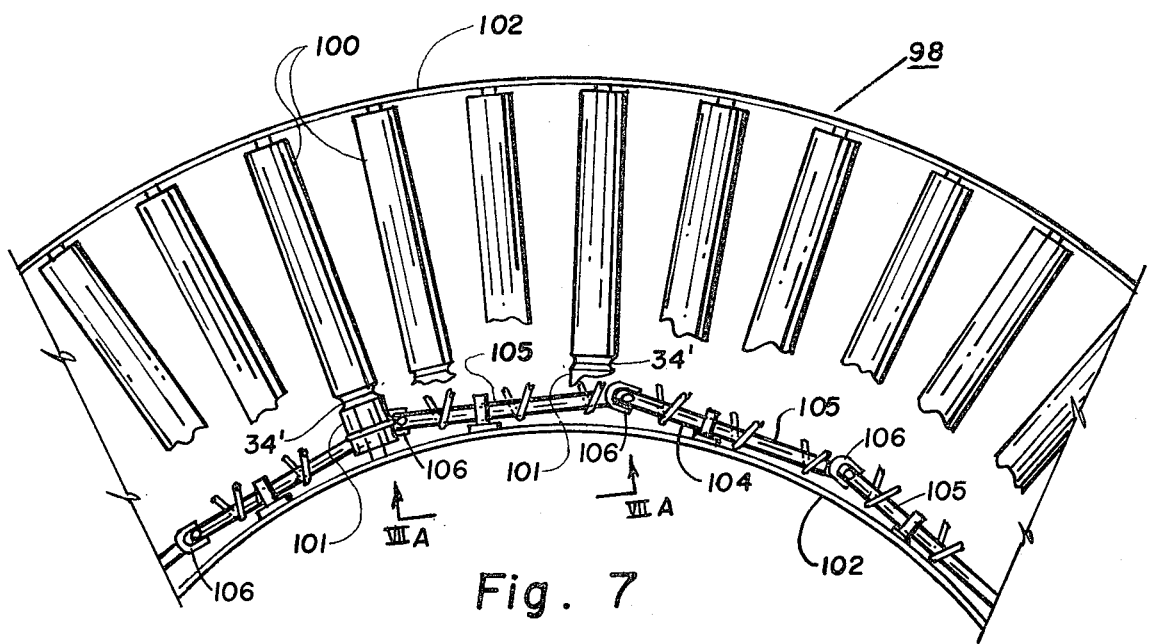
FIG. 7 is a top plan view showing the conveyor construction of the invention arranged to accomodate a curved conveyor section.

In FIG. 7 of the drawing, means are illustrated for adapting the conveyor transmission previously described for use in a curved conveyor construction 98, which can be adjoined, if desired, to the adjacent end of a straight conveyor section, forms of which have been described previously. In this arrangement the curved conveyor 98 includes a plurality of conveyor driven rollers 100 and drive rollers 101 extended across the width of the conveyor 98 and between side rails 102 thereof. The rollers 100, 101, with magnetic couplings 34' (FIGS. 1–3) therebetween, can be mounted as described previously with the exception of their disposition at relatively slight angles to one another to form a curved array.

Figure 7A:
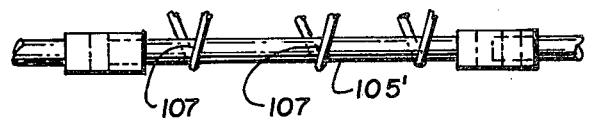
FIG. 7A is an enlarged partial elevational view of the drive shaft shown in F7 and then along reference line VIIA—VIIA thereof.

One or more relatively short driven shafts 104 are arranged beneath the curved conveyor section 98 where they are supported in a manner described previously in connection with FIGS. 1–3. The curved drive shaft arrangement 104 is arranged in this example so as to follow generally the contour of the curved conveyor section 98. These drive shaft sections 105 desirably are interconnected by means of dual universal joints 106 of conventional construction to obviate relative speed variations between the drive shaft sections 105 or between the initial drive shaft section 105 and a drive shaft such as 48 in FIG. 1 (not shown in FIG. 7). Each of the drive shafts sections 105 are connected through O-rings and magnetic couplings to their related conveyor rollers 100, substantially in the manner described above. The conveyors rollers naturally need not be disposed at a particular angle to the shaft arrangement 104, owing to the use of individual O-rings or belts. It follows, then, that the conveyor construction of my invention is admirably suited for powering the rollers of a skewed roller conveyor section (not shown). If desired, each of the drive shaft sections can be provided with grooves 107, as evident from the drive shaft section 105 shown in FIG. 7A.

Figure 8:
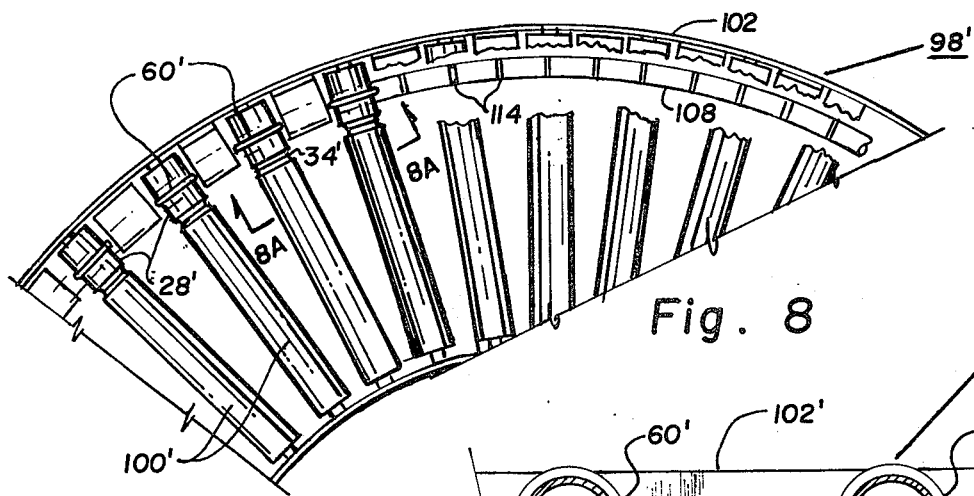
FIG. 8 is a partial top plan view of a modified form of the curved conveyor section of FIG. 7

In FIG. 8 of the drawings the drive shaft sections 105 and universal joints 106 of FIG. 7 are replaced by a flexible drive shaft 108 the adjacent end of which can be similarly joined to the drive shaft 48 of FIG. 1, if desired. Drive rollers 28' (or pulleys 46 of FIG. 2A may be substituted) are each coupled to the flexible drive shaft 108 by means of O-ring 60'. Each drive roller 28' is in turn connected through magnetic coupling 34' to its associated driven roller 100'. As noted previously in connection with FIG. 7 the driving and driven rollers 28', 100' are substantially similar to those illustrated in FIGS. 1–3 with the exception of their slightly angular disposition in conformance of the curvature of the conveyor section 90'.

Figures 8A, 9:
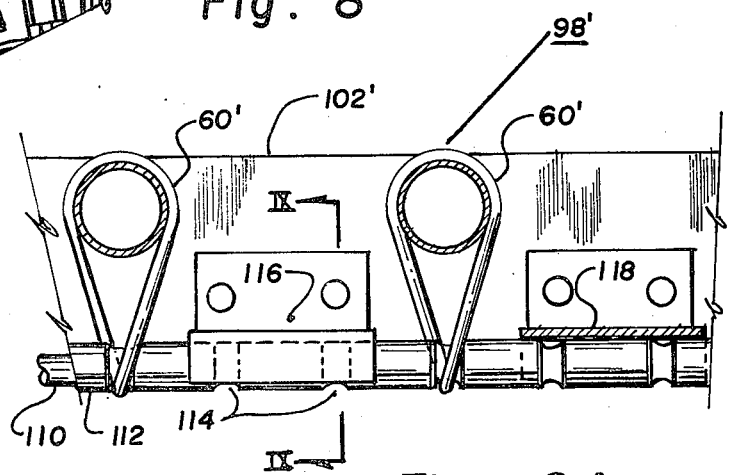
FIG. 8A is an enlarged partial sectional view of the conveyor construction of FIG. 8 and taken along reference line 8A—8A thereof.
FIG. 9 is a sectional view of the apparatus as shown in FIG. 8A and taken along reference line IX-IX thereof.

In this arrangement the flexible shaft 108 includes a metallic core structure 110 (FIGS. 8A, 9) fabricated in a typical flexible shaft connection such as a stranded cable. A rather thick coating 112 of a suitable elastomeric material such as polyurethane is bonded by conventional techniques to the surfaces of the flexible shaft core 110. A plurality of grooves 114 are formed in the elastomeric coating and spaced therealong, as determined by the adjacent spacing between the driving rollers 28', to receive the O-rings 60'. The flexible drive shaft 108 can be driven directly from suitable drive means such as electric motor 50 and transmission 52 of FIGS. 1–3, or as noted above with respect to FIG. 7, the flexible shaft 108 can be directly connected to the adjacent end of straight drive shaft 48" of conveyor section 30".

I also contemplate novel means for rotatably supporting the flexible drive shaft 108 in its curved configuration. One form of such means is shown in more clearly in FIGS. 8A and 9 and includes a curved bearing bracket 116 secured in this example to the outer curved conveyor rail 102'. Desirably, the flexible shaft 108 and the array of driving rollers 28' is thus placed adjacent the outer rail 102' to lessen the degree of curvature of the shaft 108. A number of semi-cylindrical bearing sleeves 118 are spacedly secured along the length of the bearing bracket 116 and are shaped to receive at least some of those portions of the flexible drive shaft 108 which are intermediate adjacent pairs of O-rings 60'. The inner surface of the sleeve bearings 118 can be provided with an anti-frictional coating such as nylon or teflon or other bearing material which is compatible with the material comprising the heavy coating 112.

In the operation of the conveyor construction 98' the normal tension of the O-rings 60' when wrapped about the flexible drive shaft 108 and individually about the driving rollers 28' urges the drive shaft 108 sufficiently against the bearing sleeves 118 to maintain the desired curvature and disposition of the drive shaft 108 as the latter is rotated. The spaced 120 between adjacent bearing sleeves 118 afford adequate space for assembly and operation of the O-ring 60'. It is contemplated that the grooves 114 can be omitted in certain applications of the invention and that the O-rings 60' can be wrapped about a smooth outer surface of the flexible shaft 108.

With any of the arrangements shown an efficient conveyor construction and driving mechanism therefor can be constructed. The invention can be applied with equal facility to either straight or curved conveyor section as required. A skewed roller conveyor (not shown) can be readily constructed without the problems entailed in conventional roller conveyors simply by disposing the conveyor rolls at the desired acute angle to the drive shaft 48. Regardless of the particular configuraion of the roller conveyor a precisely limited torque is applied to each of the rollers independently of the other rollers in the conveyor. Naturally, not all of the conveyor rollers need be powered; for example, only one each of selected groups of the rollers may be powered when the conveyor construction is used in an inclined configuration to provide a braking action in an otherwise gravity operated conveyor. Owing to the transmission of relatively small torque, wear of the various transmission components is minimized. Finally, the conveyor construction is considerably simplified and the space requirements for its drive mechanism are minimal.

It will be understood that, where appropriate, the magnetic coupling shown in a given figure can be substituted for the magnetic couplings of other figures. In addition, one or more of the magnetic coupling arrangements of the aforementioned U.S. Pat. No. 3,610,406 can be similarly substituted.

From the foregoing it will be apparent that novel and efficient forms of a limited torque conveyor construction have been described herein. While I have shown and described certain presently preferred embodiments of the invention and have illustrated presently preferred methods of practicing the same, it is to be distinctly understood that the invention is not limited thereto, but may be otherwise variously embodied and practiced within the spirit and scope of its teachings. It is also to be understood that certain features of the invention can be used in a specific application without a corresponding use of other features also disclosed herein.

I claim:

1. A roller conveyor having a plurality of rollers rotatably mounted to define a pass line for articles conveyed by said conveyor, a flexible line drive shaft rotatably mounted adjacent said rollers and extending longitudinally of said pass line, a magnetic coupling and a drive belt for coupling each of said rollers to said drive shaft for limited-torque rotation thereby, said conveyor being a curved section having said conveyor rollers disposed in an arcuate array, means for extending said drive shaft in a generally arcuate configuration along said curved section, said extending means including an arcuate array of bearing members in which said shaft is maintained by means of said drive belts, said bearing members being shaped to receive said flexible shaft.

2. The combination according to claim 1 wherein said bearing members are disposed between at least some of the adjacent pairs of said drive belts.

* * * * *